July 8, 1924.

J. F. O'CONNOR 1,500,148

FRICTION SHOCK ABSORBING MECHANISM

Filed July 19, 1922    2 Sheets-Sheet 2

Witnesses
Wm. Geiger

Inventor
John F. O'Connor
By Geo. I. Haight
His. Atty

Patented July 8, 1924.

1,500,148

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed July 19, 1922. Serial No. 575,964.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

An object of the invention is to provide a high capacity friction shock absorbing mechanism especially adapted for railway draft rigging and wherein are provided large wearing areas, few parts relatively inexpensive to manufacture, and the parts so designed as to permit of low pressure per unit of friction area.

Figure 1:
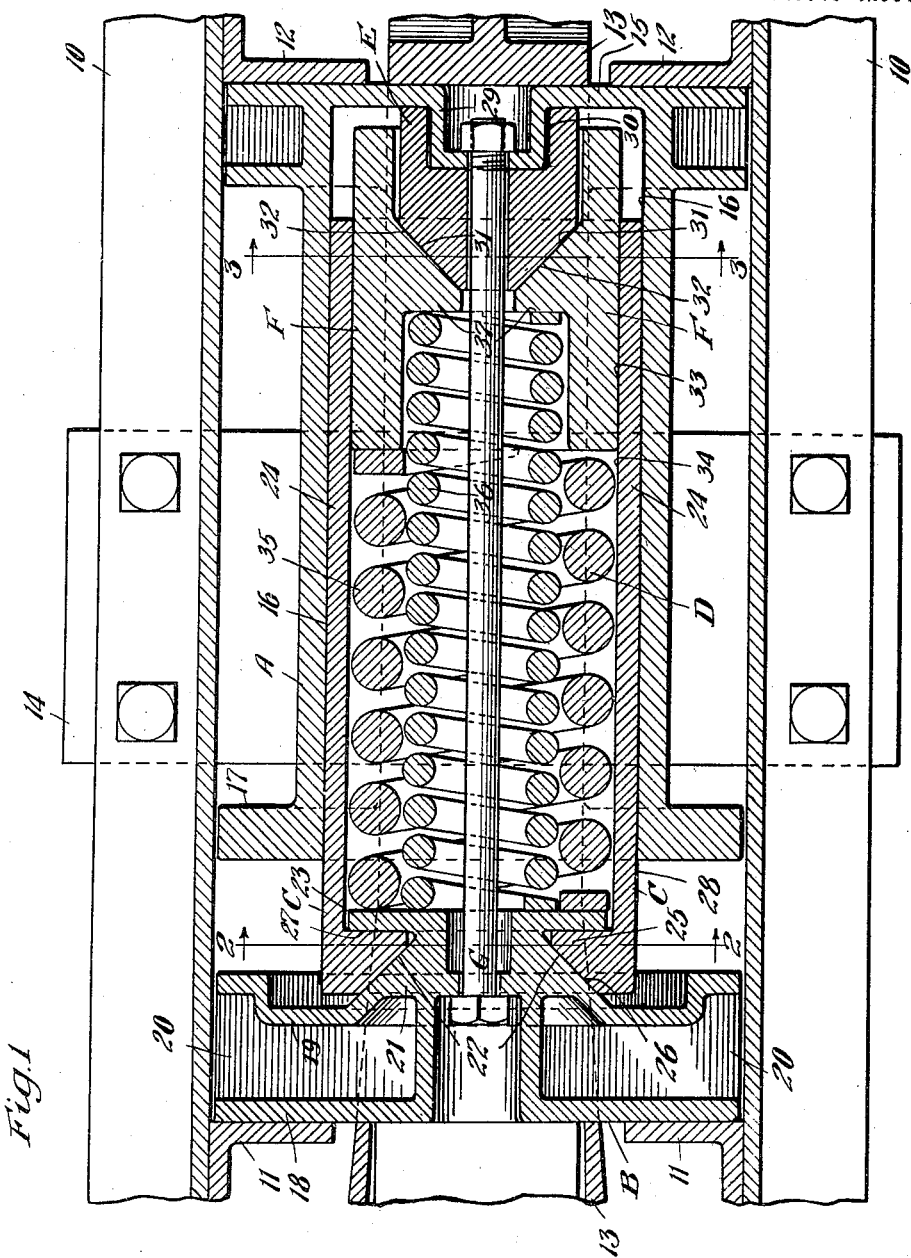
Figure 2:
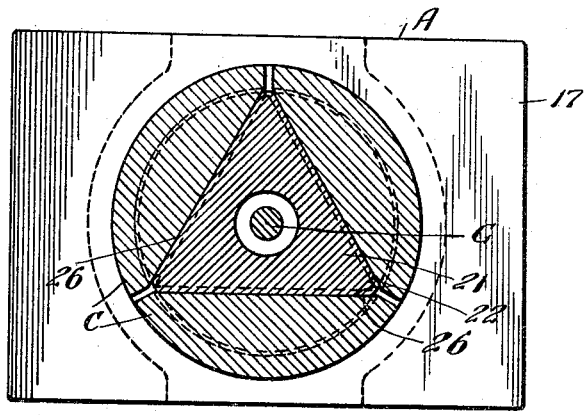
Figure 3:
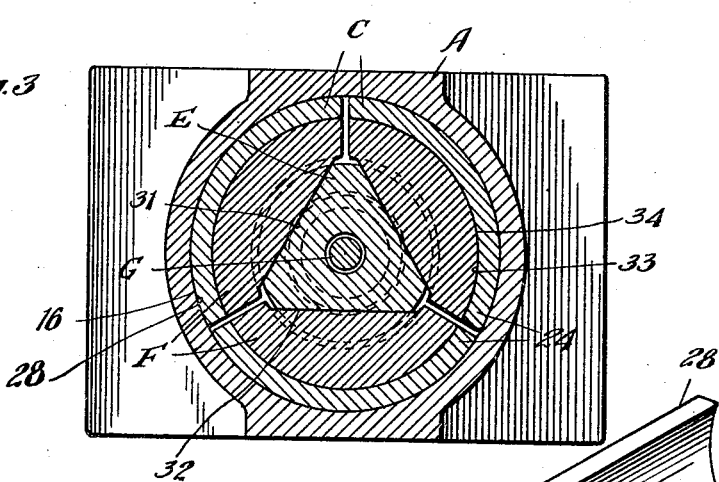
Figure 4:
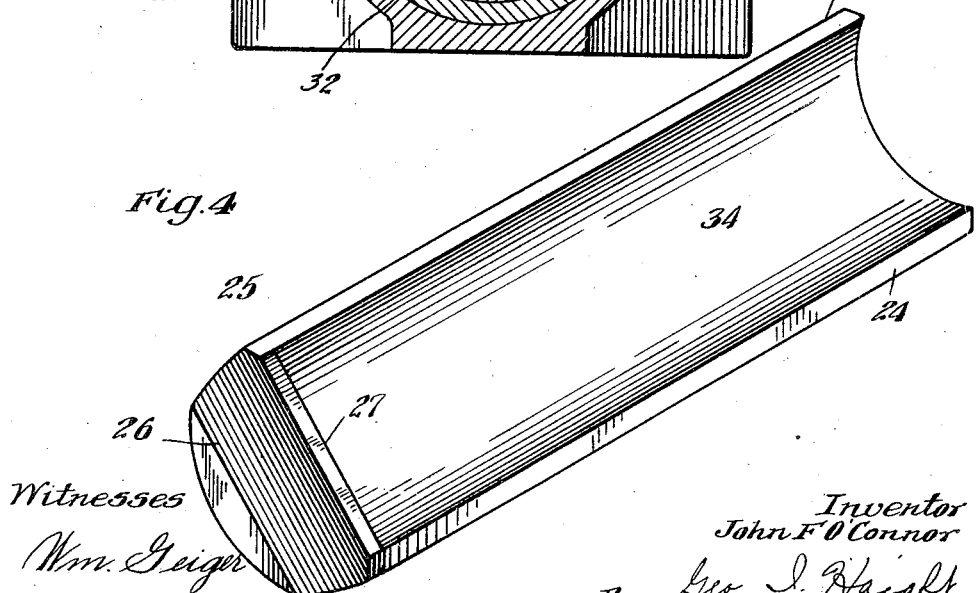

In the drawings forming a part of this specification, Figure 1 is a horizontal longitudinal sectional view of a portion of a railway draft rigging showing my improvements in connection therewith. Figures 2 and 3 are vertical transverse sectional views corresponding to the section lines 2—2 and 3—3 respectively of Figure 1. And Figure 4 is a detail perspective of one of the elongated friction shoes.

In said drawings, 10—10 indicate the usual channel draft sills of a car underframe to the inner faces of which are secured front stop lugs 11 and rear stop lugs 12. The shock absorbing mechanism proper is inserted within a hooded cast yoke 13 by which it is adapted to be operatively associated with the drawbar. Said mechanism and the yoke are supported in operative position by means of a detachable saddle plate 14.

The improved shock absorbing mechanism proper, as shown, comprises an outer casing A; a follower B; a series of circularly arranged friction shoes C; a spring resistance D; a wedge block E; a plurality of wedge-friction-shoes F; and a retainer bolt G.

The outer casing A, preferably in the form of a casting, is shown as of cylindrical form with an integral rear wall 15 laterally extended and suitably reinforced to adapt it to act as the rear follower of the mechanism. On its interior, the casing A provides a cylindrical friction surface 16 extending lengthwise of the gear. At its outer open end, the casing A is laterally flanged, as indicated at 17, so as to provide more substantial stops to limit the relative approach of the follower B and casing A.

The follower B, as shown, is also preferably in the form of a casting having an outer transverse web 18 and inner transverse web 19, the same being connected by suitable radially extending flanges 20. On the inner face of the web 19, is formed an integral wedge section 21 having three wedge faces 22, converged inwardly of the mechanism. At the inner end of the wedge section 21, the follower B is formed with an integral overhanging laterally extended flange 23, for the purpose hereinafter described.

Each of the friction shoes C, three in number, is formed with an elongated web 24, of arcuate cross section, as shown best in Figure 3. At one end, each shoe C is provided with a radially inwardly extended thick flange 25, having a wedge surface 26 on its outer side and providing a transverse shoulder 27 on its inner side. The wedge surfaces 26 of the shoes C cooperate with the wedge surfaces 22, and it will be noted that the ribs 25 hook under the flange 23 so that, on movement of the follower B toward the left, as viewed in Figure 1, the shoes C will necessarily travel in unison therewith. This arrangement functions during the release of the mechanism, that is, when there is relative separation of the casing A and follower B. The exterior surfaces of the webs 24 as indicated at 28 are curved to conform to the curvature of the cylindrical surface 16 of the casing A and cooperate with the latter in generating friction when the mechanism is compressed. The length of the webs 24 corresponds approximately with the length of the casing A, as shown in Figure 1.

The rear wall 15 of the casing A is formed with an integral hollow cup-shaped boss 29 extended inwardly and upon which is centered the wedge block E, the latter being suitably recessed as indicated at 30 to fit over the boss 29. Said wedge block E is formed with three flat wedge faces 31, each of which is adapted to cooperate with a corresponding wedge face 32 formed on a wedge-friction-shoe F. The wedge-friction-shoes F are curved on their outer faces as indicated at 33 and said surfaces 33 frictionally cooperate with the inner friction surfaces 34 formed on the inner sides of the elongated shoes C.

The main spring resistance D preferably consists of an outer heavy coil 35 which bears at one end upon the laterally extended flange 23 and at its other end on the ends of the wedge-friction-shoes F. An inner lighter nested coil 36 is also used, the same bearing at one end upon said flange 23 and at its other end upon the transverse shoulders 37 formed by the wedge sections of the shoes F.

The retainer bolt G is anchored at one end within a hollow boss 29 and at its other end within a socket formed in the follower B, the wedge block E and follower B being suitably apertured to accommodate the shank of the bolt.

The operation of the device is as follows, assuming a compression stroke of the mechanism. As the follower B approaches relatively toward the casing A, the friction shoes C will be pressed laterally outwardly by means of the wedge section 21 on the follower B and the wedging system at the other end of the mechanism comprised of the wedge block E and the wedge-friction-shoes F. In this manner, I am enabled to obtain approximately uniform pressure outwardly on the shoes C throughout their length so as to minimize tendency of the parts to score at certain sections. Friction will of course be generated between the shoes C and the casing A and additional friction will be generated between the shoes C and the wedge-shoes F. The compression stroke is limited, preferably by having the follower B engage with the laterally enlarged outer end of the casing A. Upon removal of the actuating force, it is evident that the main spring D will expand, thus forcing the follower B and casing A relatively apart, the spring D always serving to maintain the wedging system at the right-hand end of the mechanism, as viewed in Figure 1, in operative condition to perform its function. As the follower B is separated from the casing A, the shoes C will be pulled simultaneously therewith by the flange 23, as hereinbefore described.

From the preceding description, considered in connection with the drawing, it will be seen that all of the cast parts of my mechanism may be readily manufactured at comparatively small expense; that an unusually large amount of friction wearing area is obtained with consequent possibility of employing comparatively low pressure per unit of area. By placing the spring D under an initial compression which may be held by the retainer bolt G, provision is made for automatic compensation for wear of the friction surfaces and furthermore, the parts may be shipped as an assembled unit, thereby facilitating application of the mechanism to a car.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with an outer casing open at one end and provided with a follower at its other end, said casing having an interior longitudinally extending friction surface; of a follower movable relatively toward and from said casing and provided on its inner side with a wedge section and a laterally extended flange overhanging the wedge section; a plurality of friction shoes telescoped within said casing and having wedge sections at one end engageable with said follower wedge section and beneath said flange thereof; a wedge carried by said casing at the follower end of the casing; a plurality of wedge-friction-shoes interposed between said wedge block and the adjacent ends of the elongated friction shoes; and a spring bearing at one end upon said follower and directly at its other end upon said wedge-friction-shoes.

2. In a friction shock absorbing mechanism, the combination with an outer casing; of a plurality of elongated shoes telescoped within and frictionally cooperable with said casing; a follower movable toward and from said casing; cooperable wedge means on said follower and adjacent ends of said shoes tending to force the shoes laterally outwardly; wedge means movable with said casing and cooperable with the opposite ends of said shoes to press said shoes laterally outwardly; spring means engaging said follower, said means reacting between the latter and the last named wedge means, operative to yieldingly resist relative approach of the casing and follower, and to effect an initial outward movement of said follower independently of said shoes during release of the mechanism; and cooperable means on said followers and adjacent ends of said shoes for retracting said shoes upon separation of the follower and casing.

In witness that I claim the foregoing I have hereunto subscribed my name this 30th day of June, 1922.

JOHN F. O'CONNOR.

Witnesses:
UNA C. GRIGSBY,
ANN BAKER.